United States Patent
Pauly et al.

(10) Patent No.: US 6,854,558 B2
(45) Date of Patent: Feb. 15, 2005

(54) OVERLAY STEERING SYSTEM AND METHOD FOR MOTOR VEHICLES

(75) Inventors: Axel Pauly, Karlsfeld (GB); Goetz Baumgarten, Karlsfeld (GB)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/106,830

(22) Filed: Mar. 27, 2002

(65) Prior Publication Data

US 2002/0157893 A1 Oct. 31, 2002

(30) Foreign Application Priority Data

Mar. 30, 2001 (DE) .......................................... 101 15 802

(51) Int. Cl.⁷ .............................................. B62D 5/04
(52) U.S. Cl. ...................................... 180/446; 180/443
(58) Field of Search ........................... 180/443, 421, 180/422, 446, 402, 403

(56) References Cited

U.S. PATENT DOCUMENTS

| | | | | |
|---|---|---|---|---|
| 5,097,917 A | * | 3/1992 | Serizawa et al. | 180/402 |
| 6,053,270 A | * | 4/2000 | Nishikawa et al. | 180/168 |
| 6,082,482 A | * | 7/2000 | Kato et al. | 180/402 |
| 6,144,908 A | * | 11/2000 | Yasuda | 701/41 |
| 6,244,371 B1 | * | 6/2001 | Bohner et al. | 180/403 |
| 6,308,122 B1 | * | 10/2001 | Nishizaki et al. | 701/41 |
| 6,336,519 B1 | | 1/2002 | Bohner et al. | |
| 6,343,671 B1 | * | 2/2002 | Ackermann et al. | 180/444 |
| 6,502,661 B1 | * | 1/2003 | Heitzer | 180/403 |
| 6,505,703 B2 | * | 1/2003 | Stout et al. | 180/446 |
| 6,588,540 B2 | * | 7/2003 | Graber et al. | 180/402 |
| 2003/0150665 A1 | * | 8/2003 | Weeber et al. | 180/421 |

FOREIGN PATENT DOCUMENTS

| | | |
|---|---|---|
| GB | 3121008 | 2/1991 |
| GB | 3929175 | 3/1991 |
| GB | 4332836 | 9/1994 |
| GB | 19833460 | 1/2000 |
| GB | 19834868 | 2/2000 |
| GB | 19834870 | 2/2000 |
| GB | 19859806 | 7/2000 |
| GB | 19908357 | 8/2000 |
| GB | 10019152 | 12/2000 |
| GB | 10013711 | 10/2001 |

* cited by examiner

Primary Examiner—Daniel G. DePumpo
(74) Attorney, Agent, or Firm—Crowell & Moring LLP

(57) ABSTRACT

An overlay steering system for a vehicle includes a mechanical steering apparatus for the transfer of a steering torsional moment at a predetermined transfer ratio to at least one steered wheel, a wheel angle sensor connected to at least one steered wheel for generating a wheel angle signal corresponding to an angle of the at least one steered wheel, a comparison device for comparing the steering angle signal and the wheel angle signal as well as for generating a comparison signal based on the steering angle and the wheel angle, and an electromechanical converter for generating the overlay torsional moment, if the comparison signal indicates the presence of a deviation from the predetermined relation between the steering angle and the wheel angle of the at least one steered wheel, resulting in a reduction of the deviation.

23 Claims, 1 Drawing Sheet

OVERLAY STEERING SYSTEM AND METHOD FOR MOTOR VEHICLES

BACKGROUND OF THE INVENTION

The invention relates to an overlay, superimposing, or superposition steering system and method for motor vehicles (hereinafter referred to as an "overlay system" and an "overlay method").

DE 198 59 806 discloses a steering system for motor vehicles that includes a driver-adjusted mechanism for the steering angle using a steering handle, and a control and regulating apparatus that activates the steered vehicle wheels using a motor-driven adjusting assembly. For emergencies, an automatically activated forced coupling is used between the steering handle and the steered vehicle wheels. This forced coupling has a centering mode that can be activated allowing for the adjustment of the steering wheel, while the forced coupling is at least partially switched off, until a position is reached in which the steering wheel is in a normal position when the steered vehicle wheels are in a straight position.

The disadvantage of this steering system is that the switching from an electronic steering (steer-by-wire) to a mechanical forced coupling between the steering handle and the vehicle wheels is a potential source for errors.

Therefore, it is an object of the present invention to provide a reliable centering system for an overlay steering system of a motor vehicle. The overlay steering system has a mechanical connection between the steering handle and the vehicle wheels.

This object is achieved with an overlay steering system for motor vehicles described hereinafter.

An overlay steering system of the present invention can generate, in addition to the driver steering angle, computer-defined steering angle components by way of an overlay actuator. This way, it is possible to change the path relationship or angle relationship between a steering apparatus and a steering angle of the wheels as a function of different values. At the same time, a permanent mechanical connection between the steering apparatus, preferably a steering wheel, and the steered wheels, remains in effect. At the first start-up of the system following a disruption or a renewed start-up following steering action with a passively shifted steering system, the relationship between the position of the steering apparatus and the position of the steered wheels may deviate in relation to the normal operating state. A deviation can also occur if an external disruption is compensated for using a controlled steering angle component while the vehicle is brought to a stand-still.

The method according to the invention eliminates the offset between the position of the steering apparatus and the steered wheels a manner that is not noticeable to the driver, non-disruptive and safe. This is accomplished by utilizing the overlay actuator and the computer of the active steering system to center the steering.

The overlay steering system according to the invention for a motor vehicle may include (1) a mechanical steering apparatus for the transfer of a steering torsional moment with a predetermined transfer ratio to at least one steered wheel, (2) an overlay actuator between the steering apparatus and the at least one steered wheel for the overlay of the steering torsional moment, (3) a steering angle sensor connected to the steering apparatus for generating a steering angle signal that corresponds to an angle of the steering apparatus, (4) a wheel angle sensor connected to the at least one steered wheel for generating a wheel angle signal corresponding to an angle of the at least one steered wheel, (5) a comparison device for comparing the steering angle signal and the wheel angle signal and for generating a comparison signal based on the steering angle and the wheel angle, and (6) an electromagnetic converter for generating the overlay torsional moment to reduce the deviation if the comparison signal indicates a deviation from the predetermined relation between the steering angle and the wheel angle of the at least one steered wheel.

The overlay torsional moment may be generated when the vehicle is standing still. In this case, the position of the mechanical steering apparatus is adjusted until the deviation from the predetermined relation is eliminated.

During travel the overlay torsional moment is generated in such a way that it has the same direction as the steering torsional moment, causing the actual transfer ratio to be larger than the predetermined transfer ratio.

Furthermore, the overlay torsional moment can be determined during travel based on the output signal of a speed sensor.

Other parameters for determining the overlay torsional moment during travel may be the steering torsional moment and the steering angle.

In another preferred embodiment, an acoustic and/or optical signal is emitted if the comparison signal indicates a deviation from the predetermined relation between the steering angle and the wheel angle of the at least one steered wheel, or if the overlay torsional moment is larger than a predetermined value.

In another preferred embodiment of the invention, the overlay torsional moment is always smaller than a predetermined value.

In another preferred embodied example of the invention, the overlay torsional moment is generated only when the vehicle is stopped.

The overlay steering system according to the invention causes the kinematic connection between the steering wheel and the front wheels to become separated, but not the connection in terms of moment between the two. This has the advantage that the driver continues to sense a "steering feel", i.e. the effect of uneven pavement etc. from the steered wheels to the steering wheel via the steering torsional moment. Moreover, the steering torsional moment of the driver continues to be utilized for adjusting the wheels.

Another advantage of the invention is that the centering of the steering apparatus is adjusted automatically, except in unusual operating states, following delivery to the customer and as early as when the vehicle leaves the assembly line. In addition, all deviations of the steering wheel angle from the normal position are eliminated upon start-up of the vehicle or during travel. A repair shop visit is no longer necessary.

Other characteristics and examples of the invention can be derived from the following description of a preferred embodiment referring to the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
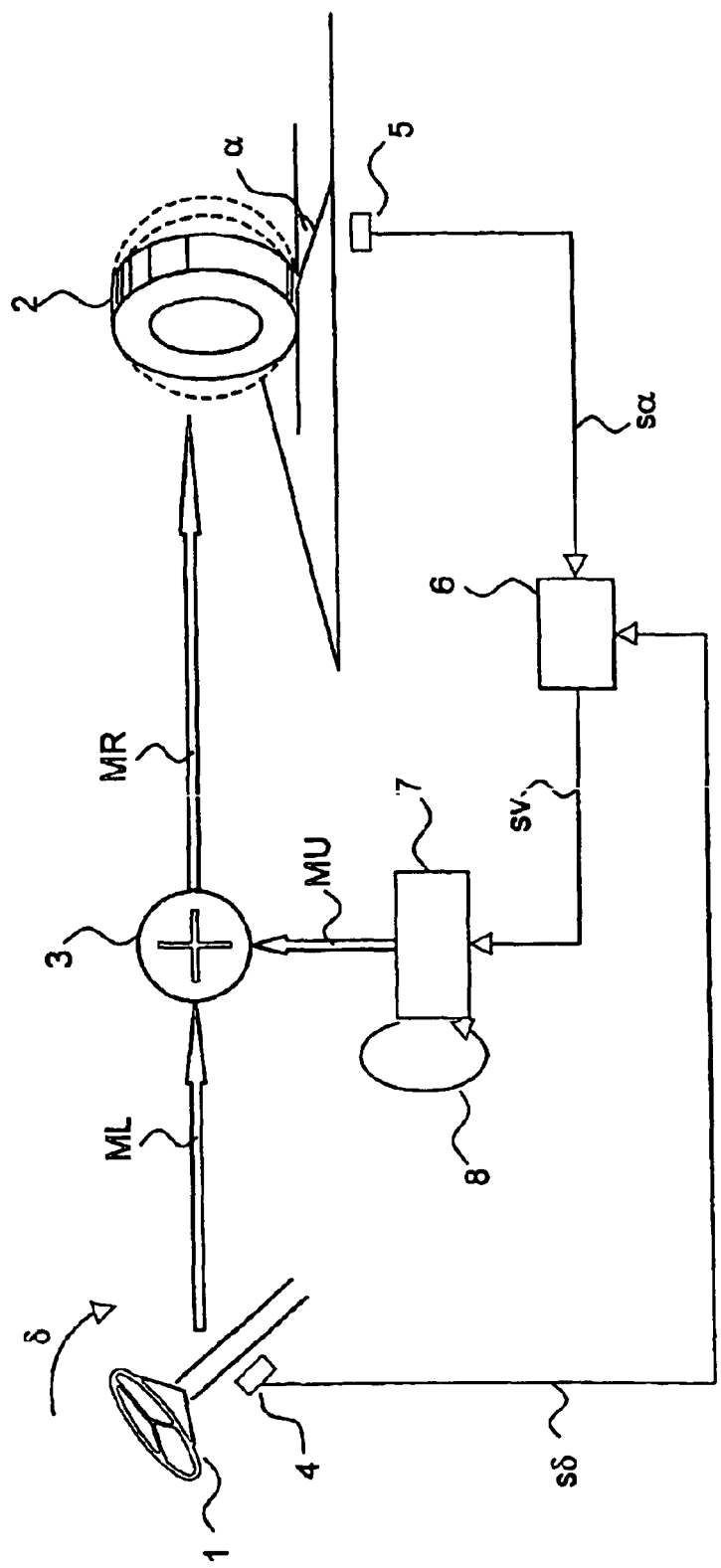
FIG. 1 shows a block diagram of an embodiment of the invention.

The overlay steering system of the present invention for a motor vehicle includes a mechanical steering apparatus 1 for the transfer of a steering torsional moment ML to at least one steered wheel 2. Torsional moments are shown in FIG. 1 as double-arrows while signals are depicted as simple arrows.

By applying a torsional moment to the steered wheel 2, said wheel is turned from a normal position to a diagonal position or from a diagonal position to a normal position. In FIG. 1 the normal position of wheel 2 is shown by broken lines and the diagonally positioned wheel 2 is indicated by solid lines.

An overlay actuator (overlay gear) 3 between the steering apparatus 1 and the steered wheel 2 is used to overlay the steering torsional moment ML with an overlay torsional moment MU. In the state of the art, an overlay torsional moment MU of this kind is used, for example, to modulate steerage for user comfort and travel safety.

The overlay of steering torsional moment (actuation torsional moment) ML and overlay torsional moment MU is the wheel torsional moment MR.

If the overlay torsional moment MU is zero, the transfer ratio $I_{ML}$ of the steering torsional moment ML to the steered wheels, i.e. the ratio between steering torsional moment ML and wheel torsional moment MR, is the transfer ratio of the steering gear (not shown). This simple relationship between the two torsional moments no longer applies if an overlay torsional moment MU is added.

In order to be able to generate the value of the overlay torsional moment MÜ based on the actuating moment ML, the output signal of a sensor connected to the steering apparatus 1 is evaluated. This sensor can be used to measure the steering angle δ of the steering apparatus 1 or to measure the steering torsional moment ML. In the embodiment shown in FIG. 1, the sensor is a steering angle sensor 4 that emits a steering angle signal sδ.

The system has a wheel angle sensor 5 mounted to the steered wheel 2, since, as mentioned previously, subsequent to a disruption or a renewed start-up of the system following a passively shifted steering system, the relationship between the position of the steering apparatus and the position of the steered wheels may deviate from the normal operating state. The steered wheel angle sensor 5 generates a wheel angle signal sα, which corresponds to the angle α of the at least one steered wheel 2. In a comparison device 6, the wheel angle signal sα is compared to the steering angle signal sδ of the steering angle sensor 4. The comparison device 6 generates a comparison signal sv that is based on the steering angle signal sδ and the wheel angle signal sα. In other words, the comparison device 6 determines as to whether the steering torsional moment ML in fact causes a change of the wheel angle α and, if so, the size of it. The relation between the steering angle δ and the wheel angle α is generally such that if the steering apparatus 1 is in a normal position, the wheel 2 is also in a normal position. In the normal position, the steering angle δ and the wheel angle α are zero.

This relationship can be distorted, for example, due to a faulty overlay torsional moment MU, and the curve, which represents the relationship between δ and α, no longer runs through the origin of coordinates featuring a δ-axis and a α-axis. This distorted relationship between δ and α must be immediately or gradually restored in order to ensure comfort and travel safety. To accomplish this, the embodiment shown in FIG. 1 uses an electromechanical converter 7 for generating an overlay torsional moment MU, which responds to the comparison signal sv from the comparison device 6. If the comparison signal sv indicates a deviation of the ratio between the steering angle δ and the wheel angle α from the predetermined relation the overlay torsional moment MU reduces the deviation between the current ratio and the desired ratio between the steering angle δ and the wheel angle α.

In general, the compensating overlay torsional moment MU can only occur (1) when the vehicle is stopped, and (2) during a stop and/or travel of the vehicle or only during travel of the vehicle. In the first instance, the driver is not affected at all while he drives the vehicle. But after the deviation occurs between the two angles δ and α, the driver must wait until he shuts off the vehicle. In the last case, the deviation is corrected immediately, and the driving comfort and safety are restored immediately following an adjustment phase.

If the relationship between the position of the at least one steered wheel 2 and the predetermined steering signal $\delta_{desired}$, which is entered by the driver, is lost during travel, in the first case, the overlay torsional moment MU is generated when the vehicle is stopped. Thus, when the driver shuts off the vehicle after travel, the electromechanical converter 7 is activated causing the position of the mechanical steering apparatus 1 to change until the deviation from the predetermined relation is eliminated. In general, in this embodiment, the steered wheels remain at rest, and only the position of the steering apparatus 1 is changed as soon as the driver releases the steering apparatus 1. For reasons of safety, the overlay torsional moment MU is generated only when the vehicle is stopped. This level of safety can be achieved when a paddle brake of the vehicle is activated, a drive train of the vehicle is interrupted, a hand brake of the vehicle is activated, any start-up of the engine is prevented or, in case of an automatic transmission, the park position is securely selected.

Subsequently, corrections during travel are described. In order to disturb the driver of the vehicle as little as possible when the overlay torsional moment MU is applied for corrective purposes during travel, the overlay torsional moment MU has the same direction as the steering torsional moment ML. This ensures that the angle α is changed proportionally more than the angle δ, which means that the actual transfer ratio $I_{akt}$ is larger than the originally predetermined transfer ratio $I_{ML}$ (without overlay torsional moment MU). In other words, the wheel 2 continues to be progressively turned, as determined by the driver corresponding to the activation of the steering apparatus 1. In the alternative, the overlay torsional moment MU can also become engaged degressively, i.e. the angle that is predetermined by the driver by way of the activation of the steering apparatus 1 is only "partially passed along to the wheel 2".

To prevent that the driver feels as if he is losing control over the vehicle, the overlay torsional moment MU in this embodiment of the invention is selected such that the change of the wheel angle α and/or of the steering angle is always smaller than a predetermined maximum adjusting angle Δα max and/or Δδ max. This means that, under normal conditions, the reduction of the deviation of the actual ratio between the two angles δ and α from the predetermined relation is implemented by way of several driver-generated activations of the steering apparatus 1. This ensures that the automatic correction is limited to a value necessary for safety. This embodiment preferably includes a control circuit 8 on the electromechanical converter (shown schematically in FIG. 1) for adjusting the overlay torsional moment MU. An upper limit is set in the control circuit 8 for the angle that is affected by the overlay moment, which means that the two angles δ and α are not abruptly adjusted in relation to each other. Instead, their adjustment is accomplished successively and is hardly noticeable to the driver.

Preferably, the overlay torsional moment MU is determined based on the output signal of a speed sensor (not shown) in order to increase driving comfort during the activation of the comparison device 6 and electromechanical converter 7. In particular, the overlay torsional moment can be established on the basis of the speed such that the first derivation of the angle component generated for centering is based, in terms of time, on the travel speed. In the alternative, the overlay torsional moment MU can be determined based on the steering torsional moment ML or based on the steering angle δ.

To warn drivers who are not familiar with a motor vehicle that is equipped in this way, preferably, an acoustic or optical signal is emitted, if a deviation between the steering angle δ and the wheel angle α is present in relation to the predetermined relation. The generation of a warning signal can be made dependent, specifically, on a signal threshold whereby an acoustic or optical signal is emitted only in instances when the overlay torsional moment MU exceeds a predetermined value.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An overlay steering system for a motor vehicle comprising:
    a mechanical steering apparatus for the transfer of a steering torsional moment with a predetermined transfer ratio to at least one steered wheel,
    an overlay actuator between the steering apparatus and the at least one steered wheel for overlay of the steering torsional moment,
    an overlay torsional moment in relation to a wheel torsional moment,
    a steering angle sensor connected to the steering apparatus for generating a steering angle signal corresponding to an angle of the steering apparatus,
    a wheel angle sensor connected to at least one steered wheel for generating a wheel angle signal that corresponds to an angle of the at least one steered wheel,
    a comparison device for comparing the steering angle signal and the wheel angle signal and for the generation of a comparison signal based on the steering angle and wheel angle, and
    an electromechanical converter for generating the overlay torsional moment, wherein the comparison signal indicates the presence of a deviation from the predetermined relation between the steering angle and wheel angle of the at least one steered wheel, resulting in a reduction of the deviation.

2. The overlay steering system as claimed in claim 1, wherein the overlay torsional moment is generated when the vehicle is stopped, causing the position of the mechanical steering apparatus to change until the deviation in relation to the predetermined relation is eliminated.

3. The overlay steering system as claimed in claim 1, wherein, during travel, the overlay torsional moment has the same direction as the steering torsional moment resulting in the fact that the actual transfer ratio is larger than the predetermined transfer ratio.

4. The overlay steering system as claimed in claim 1, wherein during travel, the overlay torsional moment is established based on an output signal of a speed sensor.

5. The overlay steering system as claimed in claim 1, wherein, during travel, the overlay torsional moment is established based on the steering torsional moment.

6. The overlay steering system as claimed in claim 1, wherein, during travel, the overlay torsional moment is established based on the steering angle.

7. The overlay steering system as claimed in claim 1, wherein at least one of an acoustic and optical signal is emitted, if the comparison signal indicates the presence of a deviation from the predetermined relation between the steering angle and the wheel angle of the at least one steered wheel.

8. The overlay steering system as claimed in claim 1, wherein an acoustic and/or optical signal is emitted, if the overlay torsional moment is larger than a predetermined value.

9. The overlay steering system as claimed in claim 1, wherein the overlay torsional moment is selected in such way that the adjustment of at least one of the wheel angle and the steering angle is smaller than a predetermined value.

10. The overlay steering system as claimed in claim 1, wherein the overlay torsional moment is only generated when the vehicle is stopped.

11. The overlay steering system as claimed in claim 2, wherein, during travel, the overlay torsional moment has the same direction as the steering torsional moment resulting in that the actual transfer ratio is larger than the predetermined transfer ratio.

12. The overlay steering system as claimed in claim 2, wherein during travel, the overlay torsional moment is established based on an output signal of a speed sensor.

13. The overlay steering system as claimed in claim 2, wherein, during travel, the overlay torsional moment is established based on the steering torsional moment.

14. The overlay steering system as claimed in claim 2, wherein, during travel, the overlay torsional moment is established based on the steering angle.

15. An overlay steering system for a motor vehicle comprising:
    at least one steered wheel;
    a steering apparatus for the transfer of a steering torsional moment with a predetermined transfer ratio to the steered wheel;
    an overlay actuator disposed between the steering apparatus and the steered wheel for overlay of the steering torsional moment;
    a steering angle sensor connected to the steering apparatus for generating a steering angle signal that corresponds to a steering angle of the steering apparatus;
    a wheel angle sensor connected to the steered wheel for generating a wheel angle signal that corresponds to an angle of the steered wheel;
    a comparison device connected to the steering angle sensor and the wheel angle sensor, the comparison device comparing the steering angle signal and the wheel angle signal to generate a comparison signal, wherein the comparison signal indicates the presence of a deviation from a predetermined relation between the steering angle arid the wheel angle; and
    an electromechanical converter connected to the comparison device and the overlay actuator, the electromechanical converter receiving the comparison signal and generating an overlay torsional moment on the basis of the comparison signal, wherein the overlay torsional moment is applied to at least one of the steering apparatus and steered wheel to reduce the deviation.

16. The overlay steering system as claimed in claim 15, wherein the overlay torsional moment is generated when the vehicle is stopped to move the position of the steering apparatus until the deviation is eliminated.

17. The overlay steering system as claimed in claim 15, wherein when the vehicle is moving, the overlay torsional moment is applied to the steered wheel and has the same direction as the steering torsional moment so that an actual transfer ratio as larger than the predetermined transfer ratio.

18. The overlay steering system as claimed in claim 15, wherein when the vehicle is moving, the overlay torsional moment is established based on an output signal of a speed sensor.

19. The overlay steering system as claimed in claim 15, wherein when the vehicle is moving, the overlay torsional moment is established based on the steering torsional moment.

20. The overlay steering system as claimed in claim 15, wherein when the vehicle is moving, the overlay torsional moment is established based on the steering angle.

21. The overlay steering system as claimed in claim 15, wherein at least one of acoustic and optical signals is emitted, if the comparison signal indicates the presence of the deviation from the predetermined relation between the steering angle and the wheel angle of the steered wheel.

22. The overlay steering system as claimed in claim 15, wherein the overlay torsional moment is selected in such way that each time when at least one of the wheel angle and the steering angle is adjusted to reduce the deviation, the adjustment of at least one of the wheel angle and the steering angle is smaller than a predetermined value.

23. The overlay steering system as claimed in claim 15, wherein the overlay torsional moment is generated only when the vehicle is stopped.

* * * * *